Patented Dec. 30, 1952

2,623,904

UNITED STATES PATENT OFFICE 2,623,904

NITRO ALDEHYDES AND PREPARATION THEREOF

Curtis W. Smith, Berkeley, Calif., assignor to Shell Development Company, San Francisco, Calif., a corporation of Delaware No Drawing. Application December 3, 1948, Serial No. 63,455

13 Claims. (Cl. 260—601)

This invention relates to organic compounds and to a process for the preparation of organic compounds.

More particularly, the invention relates to nitro-aldehydes and to a process for the preparation of nitro-aldehydes. The invention also relates to a new and unexpected reaction of unsaturated aldehydes with organic nitro compounds whereby the nitro-aldehydes of the invention may be prepared.

It has been discovered that nitro-aldehydes may be prepared by condensing alpha-methylidene aldehydes with nitro-substituted compounds wherein a nitro substituent group is directly linked to an aliphatic carbon atom to which there is also directly attached an atom of hydrogen. It is known from U. S. Patent 2,332,482 to Degering et al., October 19, 1943, that when crotonaldehyde is condensed with various nitro-paraffins in the presence of mildly alkaline catalysts there are obtained unsaturated nitro-alcohols. It also is well-known that saturated aldehydes such as formaldehyde, acetaldehyde, butyraldehyde, as well as various aromatic aldehydes and even various halogen-substituted saturated aldehydes, when condensed with nitro-paraffins in the presence of mildly alkaline catalysts react with the nitro-paraffins to form nitro-alcohols. Representative disclosures of processes within the latter category may be found in the following patents:

U. S. 2,132,330 to Vanderbilt, October 4, 1938
U. S. 2,132,352 to Hass and Vanderbilt, October 4, 1938
U. S. 2,132,353 to Hass and Vanderbilt, October 4, 1938
U. S. 2,135,444 to Vanderbilt, November 1, 1938
U. S. 2,139,120 to Hass and Vanderbilt, December 6, 1938
U. S. 2,139,121 to Hass and Vanderbilt, December 6, 1938
U. S. 2,146,060 to Ellis, February 7, 1939
U. S. 2,231,403 to Wyler, February 11, 1941
British 473,143, to I. G. Farbenindustrie Aktiengesellschaft, October 6, 1937

The nitro-aldehydes produced by the process of the invention are readily distinguishable from the nitro alcohols thus heretofore prepared. In view of the known reactions of saturated and aromatic aldehydes, and even of the olefinic aldehyde, crotonaldehyde, with organic nitro compounds, it indeed was surprising to discover that, when alpha-methylidene aldehydes are condensed according to the process of the invention with nitro-substituted compounds wherein a nitro substituent group is directly linked to an aliphatic carbon atom to which there is also directly attached an atom of hydrogen, nitro-aldehydes rather than nitro-alcohols, are produced.

The alpha-methylidene aldehydes are those aldehydes which have directly linked to the carbon atom in the alpha position relative to the formyl group a methylidene radical ($CH_2=$). Thus, they are the alpha, beta-olefinic aldehydes in which the remaining valences of the carbon atom in the beta position are satisfied by atoms of hydrogen. The alpha-methylidene aldehydes may also be described by means of the formula

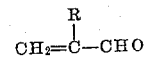

in which R is a hydrogen atom or a substituent group or atom other than hydrogen, for example, a hydrocarbon radical, such as an alkyl, aryl, cycloalkyl, aralkyl, or an alkaryl group. Particularly available and preferred are the aliphatic alpha-methylidene aldehydes, such as acrolein itself and its alpha-alkyl substitution products, i. e. 2-propenal and the 2-alkylpropenals. Acrolein thus is represented by the foregoing formula when R represents a hydrogen atom. The alpha-alkyl acroleins, or the 2-alkylpropenals, are represented by the foregoing formula when R represents an alkyl group, exemplary alkyl groups being methyl, ethyl, propyl, isopropyl, butyl, secondary butyl, tertiary butyl, the pentyl groups, the hexyl groups, the heptyl groups, the octyl groups, and analogous and homologous straight or branched chain alkyl groups. Representative aliphatic alpha-methylidene aldehydes include in addition to acrolein, alpha-substituted acroleins, such as methacrolein, alpha-ethacrolein, alpha-propyl acrolein, alpha-isopropyl acrolein, alpha-isobutyl acrolein, alpha-t-butyl acrolein, alpha-pentyl acrolein, alpha-neopentyl acrolein and their homologs and analogs.

The organic nitro compounds with which alpha-methylidene aldehydes are condensed according to the invention to form nitro-aldehydes contain a nitro group ($NO_2$) directly linked to an aliphatic carbon atom to which there is also directly linked at least one atom of hydrogen. Because of their availability and the excellent yields of desired products obtainable therefrom the organic nitro compound ordinarily will be a nitro-paraffin having at least one hydrogen atom directly linked to the carbon atom bearing the nitro group. Representative nitro-paraffins which may be employed are nitro-methane, nitroethane, 1-nitropropane, 2-nitropropane, 1-nitrobutane, 2-nitrobutane, 1-nitro-2-methylpropane, 1-nitropentane, 2-nitropentane, 3-nitropentane, 1-nitro-3-methylbutane, 1-nitro-2-methylbutane, 2-nitro-3-methylbutane, 2-nitrooctane, 3-nitrohexane, and analogous and homologous nitroparaffins. Although the nitro-paraffins will ordinarily be unsubstituted, nitro-paraffins which contain one or more non-interfering substituent groups (examples thereof being aryl, cycloalkyl, alkoxy, carbohydro-carbyloxy, acyloxy, halogen, etc.) may be reacted with alpha-methylidene aldehydes according to the invention to produce correspondingly substituted nitro - aldehydes. While more than one nitro group may be present in the nitro-paraffin and while the nitro group or groups may be linked to either a primary or a secondary carbon atom, the secondary mono-nitro-alkanes are particularly preferred, i. e., the nitro-alkanes wherein the carbon atom to which the nitro group is attached has directly bonded to it, in addition to the nitro group, one hydrogen atom and two carbon atoms.

According to the invention it has been discovered that nitro-aldehydes may be prepared in high yields by condensing alpha-methylidene aldehydes with organic nitro compounds in which the nitro group is directly linked to an aliphatic carbon atom having at least one hydrogen atom directly bonded thereto, in liquid phase, preferably in the presence of a mildly alkaline catalyst and under conditions which minimize polymerization of the alpha-methylidene aldehyde and which minimize or prevent the formation of resinous products from the reactants employed. The alpha-methylidene aldehydes are noted for their great tendency to form polymers or resins, particularly in the presence of alkaline materials, and for their tendency to condense with other compounds to form high molecular weight complex resinous or polymeric materials. The formation of undesired resinous or polymeric materials in the execution of the process of the present invention may be minimized or substantially obviated and formation of the desired nitro-aldehydes may be obtained, by conducting the reaction in liquid phase in an inert organic solvent medium consisting essentially of one or more organic solvents in which the reactants are soluble. Aqueous media are undesirable because of the great tendency of the alpha-methylidene aldehydes to form therein polymers or other undesired products, particularly in the presence of basic substances. Any inert organic solvent which is a solvent for the reactants may be employed. Suitable solvents include, without being limited to, ethers such as dimethyl ether, diethyl ether, dipropyl ether, diisopropyl ether, and homologs and analogs thereof as well as suitable substitution products thereof; esters, such as esters of carboxylic acids, for example, ethyl acetate, amyl acetate, methyl acetate, methyl valerate, and like esters; alcohols, such as ethanol, propanol, isopropanol, butanol, propylene glycol, trimethylene glycol, butylene glycol, as well as polyalkylene glycols; glycol mono- and diethers, which may be acyclic, such as mono- and dialkyl ethers of ethylene, propylene, trimethylene, butylene and higher glycols, or cyclic, intramolecular ethers, such as dioxane, tetrahydrofuran, tetrahydropyran, and the like. Hydrocarbon solvents also may be employed, such as the normally liquid paraffins, the normally liquid halogenated paraffins, and aromatic hydrocarbon solvents.

Formation of undesired resinous or polymeric products may be further minimized or substantially obviated by conducting the condensation in the presence of any of the known polymerization inhibitors which prevent the polymerization of alpha-methylidene aldehydes. Only small amounts of polymerization inhibitor, if one is employed, need be used. Based upon the combined weight of the reactants, as little as 0.01% of the polymerization inhibitor may be employed while as much as 10% or more may be used if desired. The optimum amount in any particular case will be determined in part by the particular alpha-methylidene aldehyde that is to be employed and in part upon the identity of the polymerization inhibitor used. Representative polymerization inhibitors or anti-oxidants which may be employed include, without being limited to, phenolic compounds, quinones, amines, nitroaryl compounds, alkylol amines, inorganic materials such as elemental sulfur, selenium, copper, and compounds thereof, as well as suitable organic compounds thereof. Hydroquinone is highly effective as the polymerization inhibitor. Other polymerization inhibitors which may be employed include, without being limited to, resorsinol, pyrogallol, orcinol, guaiacol, ethanol amine, nitro phenol, nitroso phenol, and many others.

For the preparation of the desired nitro aldehydes it is essential to employ the two reactants in such proportions that there is present less than two mols of nitro compound per mol of the alpha-methylidene aldehyde. The reactants preferably are employed in substantially molecularly equivalent proportions. The nitro compound may be employed in moderate excess, say up to about 1.2 mols per mol of the alpha-methylidene aldehyde, although as the amount of the nitro compound is increased above an amount equivalent to the alpha-methylidene aldehyde the efficiency of the process is reduced and reduced yields of the desired nitro aldehydes are obtained. The alpha-methylidene aldehyde may be present in an amount greater than equivalent to the organic nitro compound reactant, for example, up to 4 or 5 or even more mols of the alpha-methylidene aldehyde per mol of the organic nitro compound. When the organic nitro compound reactant contains more than one hydrogen atom directly attached to the nitro-substituted carbon atom, nitro-polyaldehyde compounds may be prepared. In the presence of an excess of the alpha-methylidene aldehyde, two molecules of the alpha-methylene aldehyde may condense with one molecule of a primary nitro-alkane to produce valuable nitro-dialdehydes of the type of 4-alkyl-4-nitroheptanedials, and in the case of nitro-methane, even three molecules of the alpha-methylidene aldehyde may react with each molecule of the nitro-compound reactant. Amounts of the alpha-methylidene aldehyde greater than are required by the reaction are not essential, although they may be employed. Since excess aldehyde present tends to be converted to polymeric materials and hence is lost, amounts greater than theoretically required generally are preferably avoided.

The reaction is favored by mildly alkaline conditions as provided by the presence of an alkaline, or basic-reacting substance. Alkaline condensation catalysts may thus be employed. The alkaline condensation catalyst may be selected from a wide range and variety of materials. The oxides, hydroxides, and carbonates of the alkaline earth metals, such as calcium oxide, barium oxide, calcium hydroxide, calcium carbonate, strontium carbonate, strontium oxide, and barium carbonate, may be employed. The hydroxides and the alkaline salts of the alkali metals may be employed. Thus, small amounts of the hydroxides of lithium, of sodium, of potassium and even of rubidinum and of caesium, as well as the carbonates thereof may be used as the condensation catalyst. Other alkaline materials or basic condensation catalysts which may be employed include, for example, organic amines such as pyridine, tripropyl amine, benzyltrimethylammonium hydroxide, triamyl amine as well as basic-reacting salts such as disodium phosphate, sodium borate, sodium acetate, and the like. Potassium carbonate, because of it mildly alkaline reaction and its limited solubility in the reaction mixtures employed (which limited solubility precludes the presence of an excess in dissolved form), is a highly efficacious condensation catalyst which may be employed. The amount of the alkaline condensation catalyst which may be employed most effectively depends upon the particular reactants involved, the identity of the alkaline material or condensation catalyst and upon the other conditions of reaction. In general, amounts from about 0.5 to about 5% by weight of the reactants are satisfactory in the case of the mildly alkaline agents, while in the case of the more strongly alkaline agents, such as the caustic alkalies, proportionally lesser amounts desirably are employed under otherwise similar conditions.

The temperature at which the reaction is conducted may be about ordinary room temperatures. The condensation of the alpha-methylidene aldehyde with the organic nitro compound may be accelerated if desired by the application of heat. Temperatures as high as 100° C. may be employed, although in order to minimize possible polymerization of the alpha-methylidene aldehyde, temperatures not over about 60° C. preferably are employed. The temperature may be as low as desired. Since reduced temperatures retard the reaction, temperatures below about 0° C. ordinarily will not be employed.

The desired reaction may be effected by mixing the two reactants in the presence of the alkaline condensation catalyst, preferably in the presence of an organic solvent, or in the presence of a polymerization inhibitor or in the presence of both an organic solvent and polymerization inhibitor, and by thereafter maintaining reaction conditions until the reaction has substantially progressed. A suitable amount of the alkaline catalyst and approximately equimolar amounts of the alpha-methylene aldehyde and the organic nitro compound to be reacted therewith may be mixed in an organic solvent medium and the mixture allowed to stand, with heating if desired, until the reaction has substantially progressed. The amount of the solvent desirably corresponds to at least about 50% of the combined weight of the reactants. There is no known upper limit to the amount of solvent that may be used. It will be obvious, however, that excessively large amounts will so dilute the reaction mixture that practicable operation of the process would not be feasible. A convenient, but not critical, upper limit to the amount of the solvent to be employed is about 10 times the combined weight of the reactants. If the catalyst is soluble in the reaction mixture, once the reactants, the catalyst and the solvent have been mixed, the reaction proceeds without necessity for further manipulations. If the catalyst is one that is only slightly soluble in the reaction mixture, the reaction mixture desirably may be agitated during the reaction time in order to assure adequate contact of the catalyst with the reaction mixture. Other suitable means for affording intimate contact of the reaction mixture with an insoluble catalyst may be employed depending upon the physical form of the catalyst, e. g., whether finely divided, in massive state, etc. If a solvent is employed, the reactants may be mixed and the solvent added to the mixture, one reactant may be added to the reaction mixture in the form of a solution in the solvent and the other reactant added thereto or solutions of the two reactants in the same or in dissimilar solvents may be mixed.

The reaction time required for completion of the reaction by which the desired nitro-aldehydes are formed depends upon the particular reactants that are involved, the reaction temperature, and upon the other conditions under which the process is executed. The course of the reaction may be followed by withdrawing samples of the reaction mixture at suitable intervals and subjecting them to analysis. Unless sufficiently long reaction times are provided, inadequate quantities of the desired nitro-aldehydes are formed while with excessively long reaction times polymerization or other undesired side reactions may be favored. Under otherwise equal conditions, the rate of reaction varies with the temperature employed, or conversely, the required time varies inversely with the temperature. Generally speaking, the reaction will have progressed substantially within a period of from about 2 hours to about 36 hours from its commencement depending, as aforesaid, upon the particular conditions and reactions involved.

After completion of the reaction the desired product may be recovered from the reaction mixture in any suitable manner. The catalyst, if present in the solid phase, may be removed as by filtration, sedimentation, centrifugation, by decantation of the liquid, or by other applicable means which will be apparent to those skilled in the art. If desired, traces of the catalyst dissolved in the reaction mixture may be neutralized as by addition of acid or as by washing the mixture with a solvent with which it is immiscible and in which the catalyst is soluble, e. g., water. The desired product may be recovered from the reaction mixture by any suitable method, such as by fractional distillation, by extraction with selective solvents, by low temperature crystallization, or by other suitable methods.

Nitro-aldehydes which may be prepared according to the process of the invention are useful as chemical intermediates and in a variety of other uses. They are of interest as biologically active materials or as intermediates for the preparation of biologically active materials, such as fungicides, insecticides and the like. They may be converted to products valuable as special solvents and they may be employed with advantage in the preparation of resins.

The following examples will illustrate the principles upon which the invention is based, without, however, limiting the invention as it is more broadly defined in the hereafter appended claims. In the examples the parts are by weight.

EXAMPLE I

There were mixed in a reaction vessel provided with a mechanical stirrer, 1600 parts of diethyl ether, 356 parts of 2-nitropropane, 280 parts of methacrolein containing about 0.01% of hydroquinone, and 50 parts of finely ground anhydrous potassium carbonate. The mixture was stirred for 18 hours during which time the temperature was substantially at room temperature (20° C. to 30° C.). The resulting mixture was removed from the reaction vessel and the excess or undissolved potassium carbonate was removed by filtration. The filtrate was then fractionally distilled. After removal of low boiling forerun, there was collected 503 parts of a slightly yellow liquid distilling between 66° C. and 78° C. at a pressure of 0.14 mm. of mercury. The low boiling forerun was redistilled and there was collected besides ether, 20 parts of unreacted methacrolein and 30 parts of unreacted 2-nitropropane. The fraction distilling between 66° C. and 78° C. under 0.14 mm. of mercury pressure was identified as slightly impure 2,4-dimethyl-4-nitropentanal. The fraction represented a 79% conversion of product based on the reactants employed and an 85% yield of product based on reactants consumed. A portion of the 2,4-dimethyl-4-nitropentanal was redistilled and a heart cut having the following properties was collected:

Boiling point _____ 66–68° C. (0.14 mm. mercury pressure).
Refractive index (n 20/D) 1.4551.
Specific gravity (20/4) ____ 1.063.
Analyses:

Found _____ { 52.5% C.
8.2% H.
8.77% N.
Caluculated for
C7H13NO3 _____ { 52.8% C.
8.2% H.
8.80% N.

The 2,4-dinitrophenylhydrazone derivative of the 2,4-dimethyl-4-nitropentanal was prepared and found to melt at 135.5–136.5° C. after recrystallization from ethanol. It was found to contain 20.6% nitrogen compared to a theoretical value of 20.64% calculated for the formula C13H17N5O6.

EXAMPLE II 2-nitropropane and acrolein were reacted by mixing 45 parts of 2-nitropropane with 28 parts of acrolein containing about 0.01% by weight of hydroquinone, in 80 parts of diethyl ether in which there was suspended 10 parts of anhydrous potassium carbonate. The reaction was effected by gently warming the mixture to 35° C. to 40° C. and maintaining it at this temperature for two hours while stirring. The reaction vessel was equipped with a well cooled reflux condenser to prevent excess loss of the solvent. At the end of the two-hour reaction period the mixture was filtered to remove excess potassium carbonate. The filtrate was washed by shaking with several portions of dilute aqueous hydrochloric acid and the washed filtrate was distilled. After removal of solvent and a forerun comprising unreacted acrolein and unreacted 2-nitropropane, the crude product was separated as the fraction distilling between 75° C. and 100° C. under 0.5 millimeters of mercury pressure. Amount 24.5 parts, corresponding to a 35% conversion. The product cut was redistilled under a pressure of about 0.3 millimeters of mercury and the heart cut distilling from 70° C. to 72° C. was collected. The product was identified as 4-methyl-4-nitropentanal.

A sample of the product when analyzed was found to contain 49.6% C, 7.6% H and 9.5% N, compared to values calculated for the formula C6H11NO3 of 50.99% C, 7.43% H, and 9.39% N. The 2,4-dinitrophenylhydrazone derivative of the 4-methyl-4-nitropentanal was prepared and found to melt after recrystallization from ethanol at 130–130.5° C. and to contain 21.4% nitrogen compared to a calculated value of 21.5% nitrogen.

By repeating the foregoing experiment but employing a reaction time of 18 hours and a temperature of about 25° C., a 42% conversion to product was obtained.

The compounds prepared in Examples I and II are illustrative of a novel class of nitro-aldehydes which may be produced according to the process of the invention by reacting nitroalkanes having the nitro group directly linked to a secondary carbon atom with alpha-methylidene aliphatic aldehydes. The novel class of nitro-aldehydes to which the invention relates may be defined by means of the generic structural formula

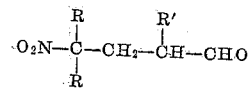

in which each R represents a hydrocarbon group and R' represents the hydrogen atom or an alkyl group. Novel compounds corresponding in structure to this formula may be prepared in an efficient manner by reacting secondary nitroalkanes which may be unsubstituted or which may also have attached to carbon atoms of the alkane residue one or more cyclic or acyclic hydrocarbon substitutent groups, with aliphatic alpha-methylidene aldehydes represented by acrolein and its alpha-alkyl substitution products. Of particular interest are the aliphatic nitro-aldehydes which correspond in structure to the structure represented by the foregoing generic equation. Preferred products may also be described by means of the formula

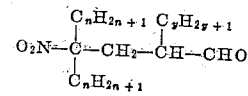

in which n represents a positive integer and y represents 0 or a positive integer. Further products corresponding in structure to the formula are disclosed in the following table:

*Table I*

| Alpha-Methylidene Aldehyde Reactant | Nitroalkane Reactant | Product |
|---|---|---|
| Acrolein | 2-Nitrobutane | 4-Methyl-4-nitrohexanal. |
| Do | 2-Nitrohexane | 4-Methyl-4-nitrooctanal. |
| Methacrolein | 2-Nitrobutane | 2,4-Dimethyl-4-nitrohexanal. |
| Do | 2-Nitrohexane | 2,4-Dimethyl-4-nitrooctanal. |
| Do | 3-Nitro-2,2-dimethyl pentane | 4-t-Butyl-2-methyl-4-nitrohexanal. |
| Alpha-ethyl acrolein | 2-Nitropropane | 4-Methyl-2-ethyl-4-nitropentanal. |
| Alpha-propyl acrolein | 2-Nitrooctane | 4-Methyl-2-propyl-4-nitrodecanal. |
| Alphe-pentyl acrolein | 3-Nitro-2,7-dimethyloctane | 4-Isopropyl-4-isoamyl-2-pentyl-4-nitrobutanal. |
| Alpha-hexyl acrolein | 2-Nitrooctane | 4-Methyl-2-hexyl-4-nitrodecanal. |

The disclosed novel nitro-aldehydes may be prepared by reacting according to the method illustrated in the preceding examples the indicated nitro-alkanes with alpha-methylidene aldehydes appearing in the table. Homologous and analogous nitro-aldehydes may be prepared in similar manner from homologous and analogous nitro compounds and holomologus and analogous alpha-methylidene aldehydes.

The novel nitro-aldehydes thus illustrated and more broadly defined by the generic formula have desirable properties which could not have been foreseen from the properties of heretofore known nitroaldehydes. Their desirable properties appear to be due in part to the direct attachment of the nitro group to a tertiary carbon atom, which carbon atom is in the gamma position to the formyl group. While secondary nitroalkanes containing from three to as many as eighteen carbon atoms and alpha-methylidene aldehydes containing from three to as many as twelve carbon atoms may be employed for the preparation according to the process of the invention of novel nitro-aldehydes represented by the last-given generic formula, the preferred products are those wherein the sum of the numbers represented by $n$ is from 3 to 12, inclusive, and the integer represented by $y$ is 10 or less. The novel nitro-aldehydes provided by the invention have a strong bacteriocidal action and hence are useful as ingredients for the compounding of improved antiseptic, bacteriocidal, and bacteriostatic compositions. They may be condensed with phenols, with urea, and allied substances to form valuable high-molecular weight polymers and resins. Additionally, the novel nitro-aldehydes thus provided are of value, because of the attachment of the nitro group to a tertiary carbon atom, which carbon atom is gamma with respect to the formyl group, as intermediates for the preparation of compounds which may be employed as improved solvents, as improved biologically active compounds, and in many other uses.

I claim as my invention:

1. An aldehyde having the structure represented by the formula

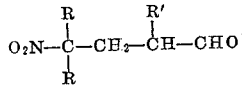

in which each R represents a hydrocarbon group and R' represents one of the class consisting of hydrogen and alkyl.

2. The process for the preparation of a nitroaldehyde having a nitro group substituted in the gamma position relative to the aldehydo group which consists of condensing one mole of a nitrosubstituted organic compound having both the nitro group and not less than one atom of hydrogen directly bonded to one and the same carbon atom with one mole of an unsubstituted alpha-methylidene aldehyde in solution in a substantially anhydrous inert liquid organic solvent in the presence of an alkaline condensation catalyst and a polymerization inhibitor at a temperature of from about 0° C. to about 100° C. and recovering said nitroaldehyde.

3. The process for the preparation of a nitroaldehyde having a nitro group substituted in the gamma position relative to the aldehydo group which consists of condensing one mole of a nitroalkane having both the nitro group and not less than one atom of hydrogen directly bonded to one and the same carbon atom with one mole of an unsubstituted alpha-methylidene aldehyde in solution in an inert liquid organic solvent in the presence of an alkaline condensation catalyst and a small amount not over about 10% by weight of the reactants of a phenolic antioxidant under substantially anhydrous conditions at a temperature of from about 0° C. to about 100° C. and recovering said nitroaldehyde.

4. The process for the preparation of 4,4-dialkyl-4-nitrobutanal which consists of mixing one mole of acrolein and not over about 1.2 moles of secondary nitroalkane in solution in a substantially anhydrous inert liquid organic solvent in the presence of an alkaline condensation catalyst and a phenolic antioxidant at a temperature of from about 0° C. to about 100° C. and after reaction has occurred isolating said 4,4-dialkyl-4-nitrobutanal.

5. The process for the preparation of 4,4-dialkyl-4-nitrobutanal which consists of condensing acrolein with one mole of secondary nitroalkane per mole of the acrolein in solution in a substantially anhydrous inert liquid organic solvent in the presence of an alkaline condensation catalyst and a small amount not over about 10% by weight of the reactants of a phenolic antioxidant at a temperature of from about 0° C. to about 60° C. and recovering said 4,4-dialkyl-4-nitrobutanal.

6. The process for the preparation of 4,4-dialkyl-2-methyl-4-nitrobutanol which consists of mixing one mole of methacrolein and not over about 1.2 moles of secondary nitroalkane in solution in a substantially anhydrous inert liquid organic solvent in the presence of an alkaline condensation catalyst and a phenolic antioxidant at a temperature of from about 0° C. to about 100° C. and after reaction has occurred recovering said 4,4-dialkyl-2-methyl-4-nitrobutanal.

7. The process for the preparation of 2,4-dialkyl-4-nitropentanal which consists of condensing an unsubstituted alpha-alkyl acrolein with one mole of 2-nitroalkane per mole of the alpha-alkyl acrolein in solution in a substantially anhydrous inert liquid organic solvent in the presence of an alkaline condensation catalyst and a phenolic antioxidant at a temperature of from about 0° C. to about 60° C. and recovering said 2,4-dialkyl-4-nitropentanal.

8. The process for the preparation of 2,4-dimethyl-4-nitropentanal which consists of mixing about equimolar quantities of methacrolein and 2-nitropropane in solution in diethyl ether and maintaining the solution in contact with added solid potassium carbonate in the presence of added hydroquinone at about room temperature for about 18 hours, and distilling to isolate said 2,4-dimethyl-4-nitropentanal.

9. The process for the preparation of 4-methyl-4-nitropentanal which consists of mixing about equimolar quantities of methacrolein and 2-nitropropane in solution in diethyl ether and heating the solution in contact with added solid potassium carbonate in the presence of added hydroquinone at about 35° C. to 40° C. for about 2 hours, and distilling to isolate said 4-methyl-4-nitropentanal.

10. 4,4-dihydrocarbon-4-nitrobutanal.

11. 4,4-dihydrocarbon-2-methyl-4-nitrobutanal.

12. 2,4-dialkyl-4-nitropentanal.

13. 2,4-dimethyl-4-nitropentanal.

CURTIS W. SMITH.

(References on following page)

REFERENCES CITED

The following references are of record in the file of this patent:

UNITED STATES PATENTS

| Number | Name | Date |
|---|---|---|
| 2,332,482 | Degering et al. | Oct. 19, 1943 |
| 2,355,402 | Sussman | Aug. 8, 1944 |
| 2,475,996 | Smith | July 12, 1949 |

OTHER REFERENCES

Shaw, Rec. Trav. Chim., vol. 17, pp. 50-65 (particularly 64, 65), (1898).

Degering, 'Outline of Organic Nitrogen Compounds" (1945), pp. 73, 74, University Lithoprinters.

Fort et al., J. Chem. Soc. (London) (1948), pp. 1907-1909.